United States Patent
Biddle

[15] 3,703,160
[45] Nov. 21, 1972

[54] PET-TENDER
[72] Inventor: Milburn Emmett Biddle, 19115 Hartland Street, Reseda, Calif. 91335
[22] Filed: Dec. 31, 1970
[21] Appl. No.: 103,043

[52] U.S. Cl....................................119/121, 119/117
[51] Int. Cl..................................................A01k 3/00
[58] Field of Search.............................119/117, 121

[56] References Cited

UNITED STATES PATENTS

| | | | |
|---|---|---|---|
| 3,070,068 | 12/1962 | Chapman | 119/121 |
| 2,502,807 | 4/1950 | Temmer | 119/121 |
| 3,100,476 | 8/1963 | Peak | 119/121 |
| 1,092,036 | 3/1914 | Fry | 119/117 |

Primary Examiner—Aldrich F. Medbery

[57] ABSTRACT

The Pet-Tender is an animal ground anchor tether, shown in FIGS. 1 and 2, is a metal stake device which is attached to the leash of an animal being confined. The stake of the Pet-Tender is completely inserted in the ground by the application of foot force on the foot step, while holding the Pet-tender by the handle in a vertical position. The leash is attached to the swivel, which is located on the crank of the Pet-Tender. Forces exerted by the animal through the leash rotate the Pet-Tender in the ground about the stake, so that the crank and foot step, which is also the crank arm, lie in the same plane with the line of applied force. The reaction forces of the ground to the foot step and the stake provide adequate resistive moments and forces to prevent removal of the Pet-Tender by the animal. The Pet-Tender may be removed from the ground by exerting a relatively small vertical pull on the handle.

2 Claims, 2 Drawing Figures

PATENTED NOV 21 1972 3,703,160
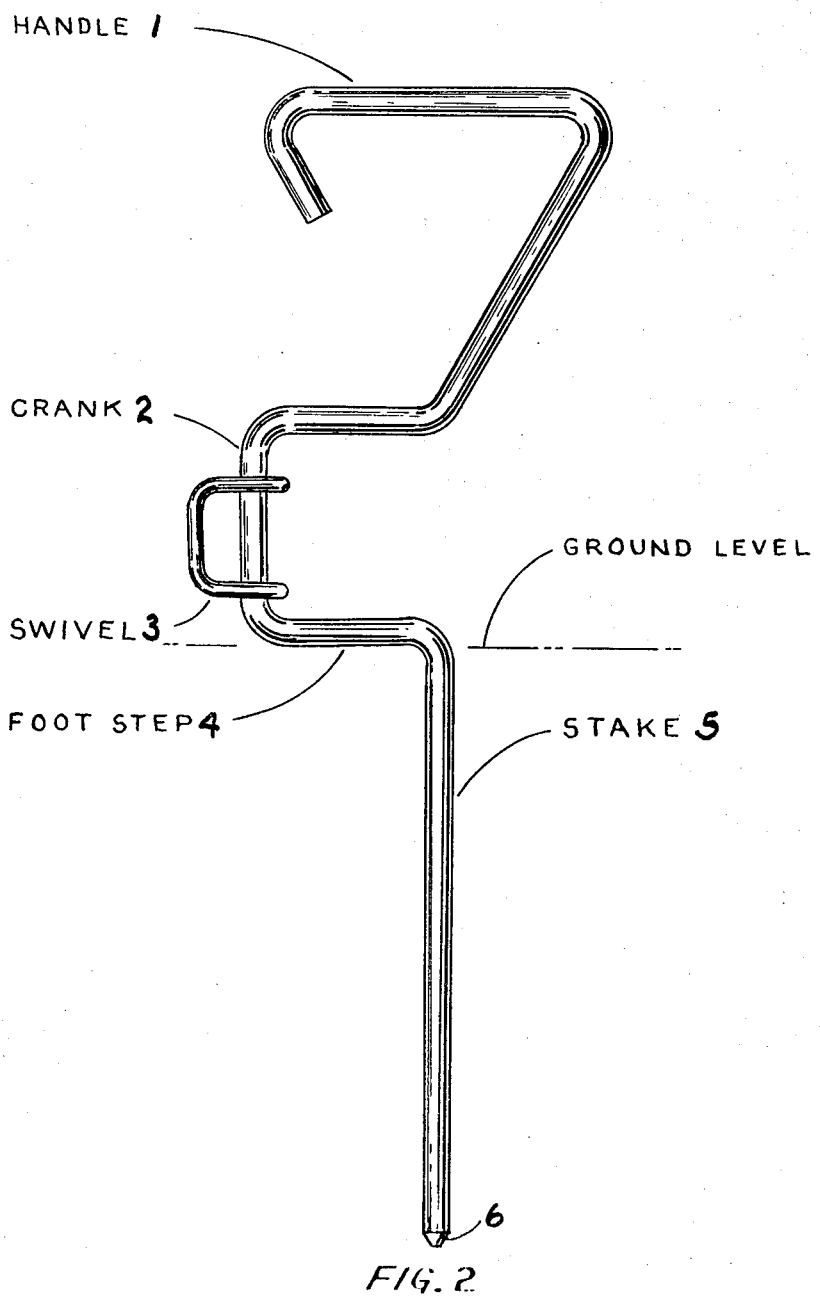

PET-TENDER

SUMMARY OF INVENTION

The Pet-Tender invention is the design configuration shown in FIGS. 1 and 2 and is unique with respect to the following:
1. A foot step is provided to facilitate inserting the stake in the ground.
2. Forces exerted by the animal through the leash and swivel, crank and rotate the foot step into a plane containing the line of applied force

DESCRIPTION OF VIEWS ON DRAWING

FIG. 1 is a plan view of the Pet-Tender and FIG. 2 is an elevation view, which calls out the legends, indicates the ground level to which the Pet-Tender is to be inserted.

DETAILED DESCRIPTION

The Pet-Tender animal tether consists of a swivel 3 assembled to a formed or bent metal rod. The swivel is free to rotate 360° to prevent the animal leash from winding up on the crank. The metal rod is formed to provide a handle 1, crank 2, foot step 4 and ground engaging stake means 5 with pointed end 6. The foot step 4 is designed to facilitate inserting the stake in the ground. The swivel 3 is pivotally mounted on the crank so that forces exerted by the animal tether on the swivel will rotate the swivel around the stake until the foot step and line of applied force lie in the same plane. This condition results in reaction moments and forces between the foot step and the ground, and coupling forces between the stake and the ground which adequately prevent removal of the Pet-Tender from the ground, provided the structural design size of the Pet-Tender is commensurate with the maximum forces the animal is capable of exerting and the conditions of the ground soil.

The Pet-Tender design configuration shown in FIGS. 1 and 2 is unique with respect to the following claims:

1. An animal ground anchor tether comprising an elongated rod means having a ground engaging portion including a pointed end and an open looped handle portion, an offset crank portion located between said ground engaging portion and said handle portion, said offset portion having a horizontal foot engaging portion and a vertical animal tethering means including a swivel leash attachment means pivotally mounted on said vertical tethering means for free 360° rotation there about, said handle means being located substantially above and contiguous with said ground engaging portion.

2. The tethering device of claim 1 wherein said crank portion is located closer to the handle portion than said pointed end and said rod is a unitary piece with angular bends defining said handle, crank and ground engaging means.

* * * * *